United States Patent [19]
Rosenberger et al.

[11] 3,755,352
[45] Aug. 28, 1973

[54] 1-(4'-METHOXYSULPHONYL-PHENYL)-3-(4''-CHLOROPHENYL)-PYRAZOLINE

[75] Inventors: Siegfried Rosenberger, Riehen; Eduard Troxler, Basel; Heinrich Hausermann, Riehen, all of Switzerland

[73] Assignee: Ciba-Geigy Corporation, Ardsley, N.Y.

[22] Filed: Nov. 30, 1971

[21] Appl. No.: 203,416

Related U.S. Application Data

[63] Continuation-in-part of Ser. No. 691,209, Dec. 18, 1967, Pat. No. 3,639,419.

[30] Foreign Application Priority Data
Dec. 23, 1966 Switzerland.................... 18479/66

[52] U.S. Cl............. 260/310 D, 117/33.5, 252/8.75, 252/89, 252/117, 252/137, 252/152, 252/161, 252/301.2 W
[51] Int. Cl............................................. C07d 49/10
[58] Field of Search................................ 260/310 D

[56] References Cited
UNITED STATES PATENTS

| | | | |
|---|---|---|---|
| 2,639,990 | 5/1953 | Kendall et al.................. | 260/310 D |
| 2,740,793 | 4/1956 | Kendall et al.................. | 260/310 D |
| 3,357,988 | 12/1967 | Hausermann et al........... | 260/310 D |
| 2,640,056 | 5/1953 | Kendall et al.................. | 260/310 D |

*Primary Examiner*—Natalie Trousof
*Attorney*—Karl F. Jorda et al.

[57] ABSTRACT

Novel 1-(4'-methoxysulphonyl-phenyl)-3-(4''-chlorophenyl)pyrazoline is described which has unexpectedly a very good affinity to cellulose ester fibers and optically brighten these fibers in pure white, free from undesirable greenish or greenish-blue hues even when applied in higher concentrations; compositions containing this novel compound as well as other substances, especially detergents, are also described; and a process for optically brightening cellulose ester and particularly cellulose acetate fibers is also disclosed.

1 Claim, No Drawings

1-(4'-METHOXYSULPHONYL-PHENYL)-3-(4''-CHLOROPHENYL)-PYRAZOLINE

CROSS REFERENCES TO RELATED APPLICATIONS

This is a continuation-in-part of application Ser. No. 691,209, filed Dec. 18, 1967, now US. Pat. No. 3,639,419.

DESCRIPTION OF THE INVENTION

The present invention concerns the novel 1-(4'-methoxysulphonyl-phenyl)-3-(4''-chlorophenyl)-pyrazoline, a process for its production, its use as optical brightener for polymeric materials as well as the polymeric materials containing said compound.

It is well known in the optical brightening of textile fibers that free arylpyrazoline-carboxylic acids and especially free arylpyrazoline-sulphonic acids have poor affinity to cellulose acetate fibers (cf. British Patent 66-9,590), while alkali metal salts of such acids are substantive to cellulose ester fibers only when said fibers are dyed in an alkaline bath which is strong enough to hydrolyze the top layer of the cellulose ester fibers, so that the optical brightener anions can draw on to the resulting free cellulose portions of the fibers. From an acid or neutral bath, the aforesaid alkali metal salts, and especially alkali metal pyrazoline-arylsulfonates, do not draw any better than the free acids.

This is also true for those arylpyrazolines which bear a sulphonamido substituent at an aryl nucleus and which have been recommended for the optical brightening of acrylic fibers (cf. French patent 1,172,759), but have insufficient drawing power on cellulose acetate fibers.

It is, therefore, an object of the present invention to provide an arylpyrazoline derivative which is an optical brightener substantive to cellulose ester and especially cellulose acetate fibers and which brightens these fibers, even when applied at high concentration, in strong and brilliant white, free from undesirable greenish or greenish-blue hues, which often occur when known pyrazoline derivatives substantive to cellulose acetate fibers are applied in higher concentrations.

This object is attained with the novel arylpyrazoline sulphonic acid ester having the formula

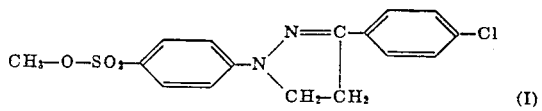

(I)

This compound is surprisingly free from the disadvantages described above in that it imparts to the treated substrates, and especially cellulose acetate fibers, on which it draws unexpectedly well, a blue violet to violet, brilliant brightening effect even when applied in high concentration.

In addition, the new optical brightener has relatively very good fastness to industrial fumes and light. These properties, therefore, are of particular technical importance for the optical brightening of cellulose acetate fibres because hitherto these fibres could be brightened in a similarly brilliant way only with 4-methyl-7-alkylaminocoumarin which is not fast to light. Also, detergents which contain perborate or percarbonate are not discoloured by this optical brightener.

The pyrazoline sulphonic acid esters of formula I is produced by reacting a sulphonic acid halide of the general formula

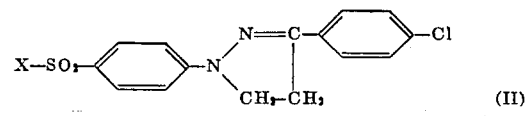

(II)

wherein X represents halogen up to the atomic number 35, preferably chlorine, with methyl alcohol, the reaction preferably being performed in the presence of reaction accelerators.

Illustrative examples of accelerators are inorganic or organic bases such as alkali metal carbonates, alkali metal hydroxides, alkali metal alcoholates, or more preferably tertiary nitrogen bases such as pyridine, triethylamine or triethylenediamine.

The pyrazoline sulphonic acid halides necessary for this reaction are obtained by processes known per se by, e.g. reacting the corresponding sulphonic acid in an inert solvent, optionally in the presence of reaction accelerators such as dimethyl formamide, with an inorganic acid halide such as thionyl chloride. They can also be produced, however, according to French Patent No. 1,172,759, by reacting the pyrazoline of formula III

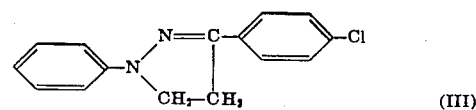

(III)

with a large excess of halogen sulphonic acid.

The reaction of the sulphonic acid halide of formula II with methanol is preferably performed in a solvent which is inert to the reaction components or in an excess of methanol or in an excess of a tertiary nitrogen base. It is preferably carried out at a temperature between 40° and 120°C.

Solvents which are inert to the reaction components are, e.g. open chain or cyclic ethers such as diethyl ether, dibutyl ether or dioxane; optionally halogenated, aromatic hydrocarbons such as benzene, toluene, xylenes, chlorobenzene, tetralin; optionally halogenated aliphatic or aromatic hydrocarbons such as chloroform, carbon tetrachloride, tetrachloroethane, decalin; amides of low fatty acids such as dimethyl formamide; N,N'-tetraalkyl ureas such as N,N'-tetramethyl urea; dialkyl sulphoxides or dialkyl sulphones such as dimethyl sulphoxide or dimethyl sulphone.

Examples of tertiary nitrogen bases are pyridine, picolines, quinoline, triethylamine, tripropylamine, N-methylpyrrolidine, N-methyl morpholine, N-methyl piperidine, quinuclidine or triethylenediamine.

Depending on the type of solvent used and on the solubility properties of the end product, the sulphonic acid ester formed either crystallizes out of the reaction mixture on cooling or it has to be isolated by the subsequent addition of water when a water miscible solvent has been used or, when difficultly water soluble solvents have been used, it has to be isolated by the distillation of the solvent.

The new pyrazoline derivative forms a colourless to pale yellow coloured, well crystallized compound which generally melts at 191° to 193°C and has good to very good solubility in organic solvents such as alcohols, ketones, carboxylic acid esters, carboxylic acid amides, chlorinated aliphatic hydrocarbons, aromatic, optionally chlorinated, hydrocarbons, dialkyl sulphoxides and dialkyl sulphones. The product has a strong blue fluorescence in ultraviolet light; in organic solution it has an intensive blue-violet to violet fluorescence even in daylight.

The new compound is suitable for the brightening of organic substrates of the most various types, mainly however, for improving the white grading of high molecular organic material from the class of synthetic products obtained by polymerisation, polycondensation or polyaddition, or from the class of partly synthetic products obtained by esterification of cellulose.

The brightener, according to the invention, can be incorporated into the substrate to be brightened or only on its surface during or after the desired shaping by incorporating it before or after polymerisation into the melted or plastified masses or, as is very often the case with the optical brightening of textile fibres, it can be onto the textile fibres from an aqueous dispersion. Preferably 0.01 to 5.0% of brightener, calculated on the substrate to be brightened, are used.

Preferably, the high molecular material in the form of fibres, e.g. yarn, fabric or finished articles made of polyolefins, polyamides, polyacrylonitrile and copolymers thereof, mainly however, made of cellulose esters such as cellulose acetates having e.g. 2-3 acyl radicals per glucose unit, are brightened with an aqueous dispersion of the pyrazoline of formula I according to the invention. The brightener dispersion preferably has a content of 0.01 to 0.5% of pyrazoline according to the invention, calculated on the fibre material. In addition it can contain auxiliaries such as dispersing agents, e.g. condensation products of fatty alcohols having 10 to 18 carbon atoms and 15 to 25 mols of ethyleneoxide, or condensation products of alkyl mono- or polyamines having 16 to 18 carbon atoms and at least 10 mols of ethylene oxide, and it can also contain acids, particularly organic acids such as acetic, oxalic and formic acid.

The fibre material is brightened with the aqueous brightener dispersion either by the drawing process at temperatures of, preferably, 50°–100°C, or in the pad dyeing process. In the latter case, the goods are impregnated with the brightener dispersion and then finished, e.g. by steaming at 70° to 100°C with saturated neutral steam. The finished fibre material is finally rinsed and dried.

Preferably, however, the fibre material mentioned is brightened by the drawing process. To produce the dispersions used in the drawing process, e.g. the pyrazoline according to the invention is either dissolved previously in a solvent such as ethylene glycol monomethyl ether and the solution added to the dye liquor containing dispersing agent, or, in the form of an aqueous slurry with a dispersing agent, it is finely milled until the particle size is less than 1 $\mu$ and the amount necessary of the preparation so obtained is further diluted with water.

High molecular organic material optically brightened according to the invention, particularly the synthetic fibre material brightened by the drawing process, has a pleasant, pure white, blue-violet to violet fluorescing appearance.

The pyrazoline sulphonic acid ester according to the invention can be applied from the washing bath by either incorporating it in amounts of, preferably, 0.01 – 1 percent, into detergents or by adding it to the washing liquors, advantageously in the form of its solutions in neutral, water miscible and/or easily volatile organic solvents such as low alkanols, low alkoxyalkanols or low ketones.

The optical brightener can be incorporated into the detergents, e.g. by mixing it with the wash active substances or kneading or milling them therewith and then mixing in the usual auxiliaries and fillers. The brightening agent is stirred, for example, with the wash active substances, the usual auxiliaries and fillers and waters to form a slurry and this is then sprayed from an atomising dryer. The new pyrazoline derivative, however, can also be admixed with finished detergents, e.g. by spraying a solution in an easily volatile and/or water soluble organic solvent onto the dry, circulating detergent.

These detergents can contain, e.g. the following wash active substances: soaps, higher fatty alcohol sulphates, alkyl-substituted aryl sulphonic acids, sulphocarboxylic acid alkyl esters, alkanoylaminoalkyl carboxylic or sulphonic acids, alkanoylaminoaryl carboxylic or sulphonic acids, or fatty acids glycerine sulphates or their soluble salts; also non-ionogenic agents such as higher alkylphenol polyglycol ethers. In addition, the detergents can contain the usual fillers and auxiliaries, e.g. alkali poly- and polymeta- phosphates, alkali silicates, alkali borates, alkali metal salts of carboxymethyl celluloses, foam stabilisers such as alkanolamides of higher fatty acids, or complex compounds such as soluble salts of ethylenediamine tetraacetic acid, as well as chemical bleachers such as perborates or percarbonates.

Compared with detergents not containing brighter, detergents containing the brighter of formula I have an improved white appearance in daylight. In addition, detergents containing perborate or percarbonate as well as the brightener according to the invention do not undergo an undesirable change in colour.

Textile fibres, e.g. synthetic polyamide and, mainly, cellulose ester fibres, washed with liquors containing the pyrazoline according to the invention of formula I have a brilliant appearance in daylight. Such liquors, therefore, can be used particularly for the washing of these synthetic fibres or of textiles wholly or partly made up of such fibres and for the washing of household linen. For use in the household wash, the liquors can also contain other optical brightening agents having affinity to different fibres, e.g. to cellulose.

Although very beautiful brightening effects are obtained with the new optical brightener on polyamide and polyacrylonitrile fibres, acetyl cellulose articles are the preferred substrate for this brightener.

EXAMPLE 1

Thirty-six g of 1-(4'-chlorosulphonyl-phenyl)-3-(4''-chlorophenyl)-pyrazoline are dissolved in 200 ml of dimethyl formamide at 80°C, 100 ml of methanol are added to the solution while stirring and then immediately, one after the other, 15 ml of 10 N sodium hydroxide solution and 400 ml of a mixture of ice and water are added. The sulphonic acid methyl ester then precipitates in the form of fine yellowish crystal needles. These are filtered off under suction, washed with water until the washing water is neutral, the filter cake is well pressed out and the brightener is dried at about 70°C in vacuo. In this way, 15 g of 1-(4'-methoxysulphonyl-phenyl)-3-(4''-chlorophenyl)-pyrazoline are obtained. The substance melts at 191°–193°C and corresponds to the formula

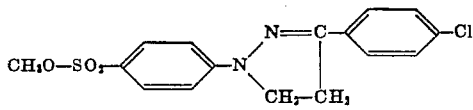

The new compound dissolves in glycol monomethyl ether with an intensive blue-violet fluorescence. The product can be used, e.g. for the brightening of cellulose acetate fibres, polyamide fibres or polyacrylonitrile fibres.

The 1-(4'-chlorosulphonyl-phenyl)-3-(4''chlorophenyl)-pyrazoline necessary in this example is obtained in the known way by reacting the sodium salt of 1-(4'-sulphophenyl)-3-(4''-chlorophenyl)-pyrazoline with thionyl chloride in chlorobenzene in the presence of catalytic amounts of dimethyl formamide.

EXAMPLE 2

A solution of 1-(4'-methoxysulphonyl-phenyl)-3-(4''-chlorophenyl)-pyrazoline is produced by dissolving 1 g in 100 ml of ethylene glycol monoethyl ether. 2.4 ml of this stock solution are added to an aqueous solution consisting of 100 ml of water, 0.6 ml of 4 percent acetic acid and 0.06 g of octadecyl alcohol pentadecaglycol ether. The aqueous brightening solution so obtained is heated to 60°C and then 3 g of a cellulose triacetate twilled fabric are introduced into the solution. The temperature is raised to 95°–98°C within 10-15 minutes and kept there for 1 hour. The fabric is then rinsed and dried. Compared with untreated starting material, the fabric so treated has clearly a more white, brilliant appearance.

EXAMPLE 3

A solution of the 1-(4'-methoxysulphonyl-phenyl)-3-(4''-chlorophenyl)-pyrazoline is produced by dissolving 1 g in 100 ml of ethylene glycol monoethyl ether. 2.4 ml of this stock solution are added to an aqueous solution consisting of 100 ml of water, 0.6 ml of 4 percent acetic acid and 0.06 g of octadecyl alcohol-pentadecaglycol ether. This preparation is heated to 40°C and then 3 g of a cellulose 2 ½-acetate satin fabric are introduced. The temperature is raised to 75°C within 10–15 minutes and kept there for 1 hour. The fabric is then rinsed and dried. Compared with untreated starting material, the fabric so treated has clearly a more white, brilliant appearance.

EXAMPLE 4

Ten g of a pale yellowish staple fibre fabric made of Nylon (E.I. Du Pont de Nemours, Wilmington, Del. USA) are treated for 30 minutes at 95°C in a bath, (liquour ratio 1:33), containing 0.02 g of the 1-(4'-methoxysulphonyl-phenyl)-3-(4''-chlorophenyl)pyrazoline and 0.16 g of concentrated acetic acid, and then rinsed and dried. The nylon fabric so treated appears considerably more white in daylight than the same but untreated fabric.

EXAMPLE 5

A solution of 0.1 g of 1-(4''-methoxysulphonyl-phenyl) -3-(4''-chlorophenyl)-pyrazoline in 10 ml of ethylene glycol monoethyl ether is added to a 50°C warm bath consisting of 3,000 ml of water, 2 g of the condensation product of 1 mol of stearyl alcohol and 22 mols of ethylene oxide, and 4 g of 85 percent formic acid. 100 g of a polyacrylonitrile fabric such as ORLON (DuPont de Nemours, Wilmington, Del. USA) are introduced and the temperature is raised to 100°C within 15 minutes. The fabric is left for 60 minutes in the 100°C hot circulating liquour whereupon it is rinsed with cold water, centrifuged and dried at 50—60°C. The treated fibre material has a pleasant white appearance.

EXAMPLE 6

The following detergent components
21.4 g of dodecylbenzene sulphonate,
32.6 g of sodium tripolyphosphate,
1.1 g of sodium carbonate,
4.5 g of sodium silicate and
19.2 g of sodium sulphate are worked into a homogeneous mass at 80°C with
75 g of water and, after addition of 0.15 g of 4,4'-bis-[4''-phenylamino-6''-($\beta$-methoxyethylaminol)-1''3''5''-triazinyl-(2'')-amino]-stilbene-2,2'-disulphonic acid sodium salt, and
0.20 g of 1-(4'-methoxysulphonyl-phenyl)-3-(4''-chlorophenyl)-pyrazoline
are well mixed and dried in an atomising dryer. The powder obtained is then blended with 12.7 g of sodium perborate.

Fifty g of goods to be washed consisting of 10 g of uncoloured polycaprolactam fabric and 40 g of uncoloured cotton fabric are washed for 20 minutes at 55°C with a solution of 5 g of the detergent described above in 1,000 g of water, rinsed and dried. A dazzling white wash is obtained.

Very good brightening effects are also obtained when 20 g of cellulose 2½-acetate and 30 g of cotton fabric are washed at 50°C for 30 minutes with the same washing liquor.

EXAMPLE 7

To produce a fine detergent,
20 g of sodium dodecylbenzene sulphonate and
8 g of sodium salt of laurin alcohol sulphate are stirred with 80 g of water and, at 60°–70°C, blended into a homogeneous mass with
0.3 g of the 1-(4'-methoxysulphonyl-phenyl)-3-(4''-chlorophenyl)pyrazoline
2 g of lauric acid monoethanolamide,
8 g of sodium tripolyphosphate,
1.5 g of carboxymethyl cellulose and
60.5 g of sodium sulphate
are added to the mixture which is then dried and the particle size is reduced.

Ten g of white Nylon are washed for 15 minutes at 55°C in 200 g of an aqueous washing liquor containing 1.0 g of the fine detergent described above, rinsed and dried. The washed goods have clearly a more white appearance than similar Nylon washed in the same way with a fine detergent of analogous composition but not containing brightener.
Ten g of white cellulose-2½-acetate goods are washed for 20 minutes at 50°C in 200 g of the above mentioned washing liquor. A beautiful white fabric is obtained.
We claim:
1. The compound of the formula
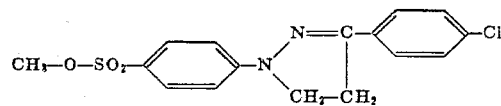
* * * * *